(12) United States Patent
Kim et al.

(10) Patent No.: US 9,731,460 B2
(45) Date of Patent: Aug. 15, 2017

(54) ANTI-GLARE FILM AND METHOD OF FABRICATING THE SAME

(71) Applicant: CHEIL INDUSTRIES INC., Gumi-si, Gyeongsangbuk-do (KR)

(72) Inventors: Jin Woo Kim, Uiwang-si (KR); Chul Jin Park, Uiwang-si (KR); Dong Yoon Shin, Uiwang-si (KR); Je Ha Woo, Uiwang-si (KR); Jong Hyuk Eun, Uiwang-si (KR); A Ra Jo, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 219 days.

(21) Appl. No.: 14/106,694

(22) Filed: Dec. 13, 2013

(65) Prior Publication Data

US 2014/0168757 A1 Jun. 19, 2014

(30) Foreign Application Priority Data

Dec. 18, 2012 (KR) .................. 10-2012-0148931

(51) Int. Cl.
*B29D 11/00* (2006.01)
*G02B 5/02* (2006.01)
*B29C 59/04* (2006.01)

(52) U.S. Cl.
CPC .... *B29D 11/0074* (2013.01); *B29D 11/00788* (2013.01); *G02B 5/0221* (2013.01); *G02B 5/0278* (2013.01); *B29C 59/04* (2013.01)

(58) Field of Classification Search
CPC ...... G02B 5/0242; G02B 5/02; G02B 5/0221; G02B 5/0231; G02B 5/0247; G02B 27/10;

(Continued)

(56) References Cited

U.S. PATENT DOCUMENTS 7,427,371 B2   9/2008  Kawanishi et al.
8,488,241 B2*  7/2013  Watanabe .............. G02B 1/04
                                                359/488.01

(Continued)

FOREIGN PATENT DOCUMENTS

CN         101779146 A      7/2010
CN         102401915 A      4/2012
KR    10-2012-0029356 A    3/2012

(Continued)

OTHER PUBLICATIONS

KIPO Office action dated Oct. 22, 2014 in KR application No. 10-2012-0148931 (7 pages).
SIPO Office action dated Feb. 14, 2016, issued in CN Application No. 201310698515.9, with English translation, 13 pages.

*Primary Examiner* — Scott J Sugarman
*Assistant Examiner* — Alberto Betancourt
(74) *Attorney, Agent, or Firm* — Lewis Roca Rothgerber Christie LLP (57) ABSTRACT

An anti-glare film and a method of fabricating the same. The anti-glare film includes a transparent substrate, a photocurable resin layer stacked on one surface of the transparent substrate, and a plurality of amorphous patterns formed on a surface of the photocurable resin layer. The anti-glare film can provide excellent diffusion of light, exhibit excellent brightness without deterioration of transmittance, and provide excellent front brightness and visibility when applied to polarizing plates and display devices.

11 Claims, 5 Drawing Sheets

(58) Field of Classification Search
CPC ........ G02B 26/04; G02B 27/281; G02B 1/11;
G02B 27/0018; G02B 5/28; G02B 5/08;
G02B 27/141; G02B 5/20; G02C 7/12;
G02F 1/133502; B60R 1/084; B60R
1/088; B60R 1/089; B60R 1/083; B60R
1/086; B60R 1/085; H01J 2229/8913;
H01J 2229/8915; H01J 2229/8916; H01J
2229/8918; H01J 2229/892; H01J
2229/8922; H01J 29/896
USPC .. 359/488, 599, 350, 229, 488.01, 601–608,
359/884; 296/96.19, 97.1; 348/834
See application file for complete search history.

(56) References Cited

U.S. PATENT DOCUMENTS

| | | | |
|---|---|---|---|
| 2002/0114923 A1* | 8/2002 | Lilly | B05D 1/42 |
| | | | 428/141 |
| 2006/0057344 A1* | 3/2006 | Sakurai et al. | 428/212 |
| 2009/0142562 A1* | 6/2009 | Miyagawa et al. | 428/212 |
| 2012/0002282 A1 | 1/2012 | Nagahama et al. | |

FOREIGN PATENT DOCUMENTS

| | | | |
|---|---|---|---|
| KR | 10-2012-0070496 A | | 6/2012 |
| KR | 10-1130629 B | | 8/2012 |
| WO | WO2011034898 | * | 3/2011 |

* cited by examiner

ANTI-GLARE FILM AND METHOD OF FABRICATING THE SAME

CROSS-REFERENCE TO RELATED APPLICATION

This application claims priority to and the benefit of Korean Patent Application No. 10-2012-0148931, filed on Dec. 18, 2012, in the Korean Intellectual Property Office, the disclosure of which is incorporated herein in its entirety by reference.

BACKGROUND

1. Field

The following disclosure relates to an anti-glare film and a method of fabricating the same.

2. Description of the Related Art

A surface of a liquid crystal display (LCD) device must diffuse light emitted from an inside thereof to some degree for prevention of glare caused by the emitted light. Moreover, the surface of the display device may have an image (a reflected image) formed thereon due to reflection of incident light entering from outside and visibility of a displayed image may be affected by a reflected image of an external object when the reflected image is clear. For example, when the display device is used outdoors under bright illumination, problems can occur due to reflection of external light, such as sunlight and fluorescent light, on the surface thereof.

To solve such problems, an anti-glare film is fabricated by forming roughness on a surface thereof through agglomeration of particles (e.g., inorganic particles) such as silica or the like, or through addition of organic fillers having a particle diameter greater than a thickness of the film (i.e., the anti-glare film) into a resin (i.e., the anti-glare film-forming resin), or the like.

However, such a typical anti-glare film provides an anti-glare function only through the roughness formed on the surface thereof. Thus, a large area of roughness must be formed on the surface of the film to improve the anti-glare property. However, that large area can cause increase of a haze value of the film, thereby deteriorating transmittance.

In addition, if the haze value of the anti-glare film is decreased, sparkle (so-called surface sparkle), occurs (e.g., strongly occurs), and if the haze value of the anti-glare film is increased to solve this problem, the degree of blackness may be decreased because the overall film is tinged white, thereby causing deterioration in brightness.

SUMMARY

In accordance with one embodiment of the present invention, an anti-glare film includes: a transparent substrate; a curable resin layer on a surface of the transparent substrate; and a plurality of amorphous patterns on a surface of the curable resin layer, wherein the anti-glare film has a gloss from about 30% to about 60% in a direction of 20°, a gloss from about 35% to about 90% in a direction of 60°, and a gloss from about 85% to about 150% in a direction of 85°, as measured using a gloss meter in accordance with ASTM D-523.

In accordance with another embodiment of the present invention, a method of fabricating an anti-glare film includes: etching a surface of an engraving roll through laser patterning to form amorphous patterns thereon; and transferring the amorphous patterns from the outer surface of the engraving roll to a curable resin.

BRIEF DESCRIPTION OF THE DRAWINGS

The above and other aspects, features and advantages of one or more embodiments of the invention will become apparent from the detailed description of the following embodiments given in conjunction with the accompanying drawings, in which.

DETAILED DESCRIPTION

An aspect according to embodiments of the present invention relates to an anti-glare film exhibiting excellent visibility. When a user views a display device from a certain distance, the anti-glare film according to one or more embodiments of the present invention provides improved visibility by reducing clearness of a reflected image of an external object due to incident light entering from outside while preventing glare due to light emitted from an inside thereof.

Hereinafter, embodiments of the present invention will be described in more detail with reference to the accompanying drawings. The use of "may" when describing embodiments of the present invention refers to "one or more embodiments of the present invention."

Anti-Glare Film

Embodiments of the present invention may provide anti-glare films prepared using laser patterning and sand-blasting.

Figure 1:
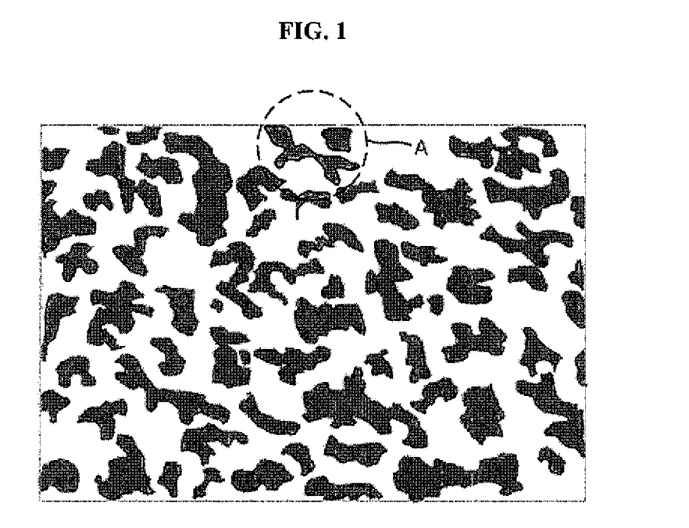
FIG. 1 is a schematic plan view of an anti-glare film according to one embodiment of the present invention.
Figure 2:
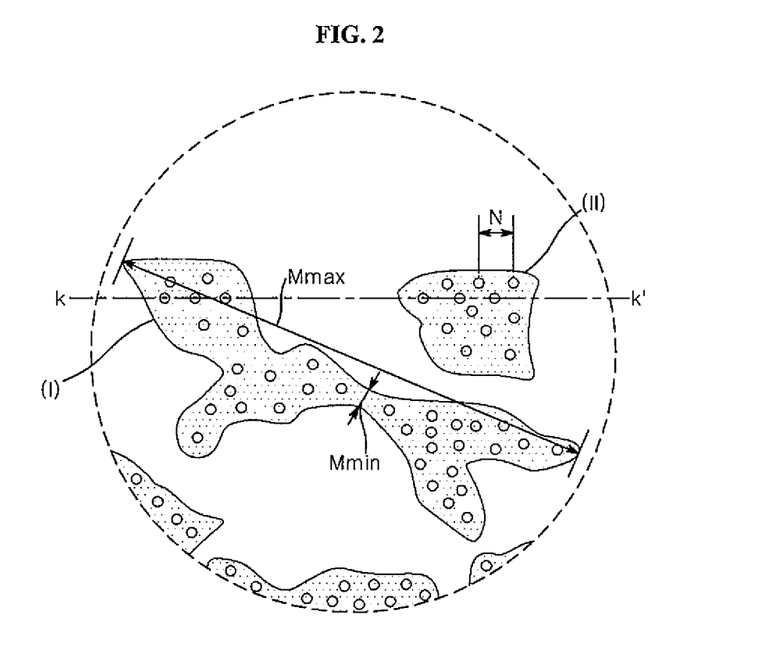
FIG. 2 is a partially enlarged plan view of region A of FIG. 1.
Figure 3:
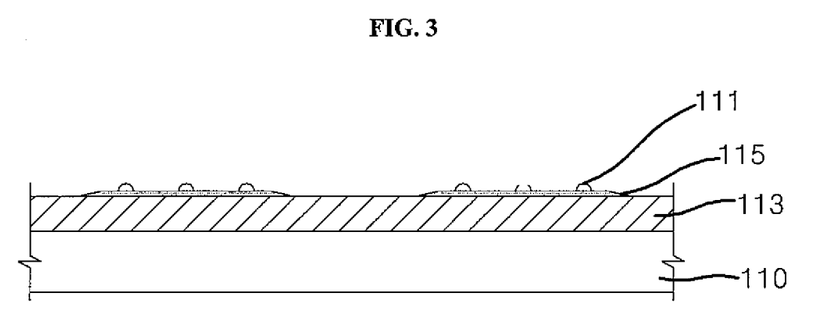
FIG. 3 is a sectional view of region A taken along the line k-k' of FIG. 2.

Referring to FIGS. 1 to 3, an anti-glare film according to one embodiment will be described in more detail. FIG. 1 is a schematic plan view of an anti-glare film according to one embodiment of the present invention, FIG. 2 is a partially enlarged plan view of region A of FIG. 1, and FIG. 3 is a sectional view of region A taken along the line k-k' of FIG. 2.

Referring to FIGS. 1 to 3, the anti-glare film may include: a transparent substrate 110; a curable resin layer 113 stacked on one surface of the transparent substrate 110; and a plurality of amorphous patterns 115 formed on a surface of the curable resin layer 113, wherein the amorphous patterns 115 may have a plurality of protrusions 111 on surfaces thereof.

Any suitable transparent material may be used as the transparent substrate 110 without limitation, for example, a polymeric material, that is, a plastic film, may be used as the transparent substrate. Examples of suitable transparent substrate materials include: cellulose such as acetyl cellulose, diacetyl cellulose, triacetyl cellulose, propionyl cellulose, acetyl propionyl cellulose, nitrocellulose, or the like; polyesters such as polyethylene terephthalate, polybutylene terephthalate, polyethylene naphthalate, poly-1,4-cyclohexane dimethylene terephthalate, polyethylene-1,2-diphenoxyethane-4,4'-dicarboxylate, cyclohexane dimethylene terephthalate, or the like; polyolefins such as polyethylene, polypropylene, polymethyl pentane, or the like; polymethyl methacrylate; polyvinyl chloride; polyvinylidene chloride; polyvinyl alcohol; polystyrene; polycarbonate; polyamide; polyethersulfone; polyetherketone; polysulfone; polyimide; and the like, without being limited thereto. For example, triacetyl cellulose (TAC), polyethylene terephthalate (PET) or polycarbonate (PC) may be used as a transparent substrate of an optical film due to excellent transparency thereof. In addition, triacetyl cellulose (TAC) or polyethylene terephthalate (PET) may be used in polarizing films for LCDs and optical filters for PDPs.

Here, the transparent substrate may have a thickness from about 50 µm to about 250 µm. If the thickness of the transparent substrate is out of this range, the film can be deteriorated in processability due to a process of aligning and stacking a polarizer on the transparent substrate.

The curable resin layer 113 is formed on one surface of the transparent substrate. The curable resin layer 113 may be a photocurable resin layer.

In one embodiment, the photocurable resin layer may include UV curable unsaturated compounds, acrylic esters, antistatic agents, silicone additives, and initiators. Thus the photocurable resin may be an UV curable resin.

As the UV curable unsaturated compounds, the photocurable resin may include (e.g., further include) an acrylate containing about 10 mol % or more of an ethylene oxide repeat unit, or a monofunctional or polyfunctional UV curable monomer. The acrylate containing about 10 mol % or more of an ethylene oxide repeat unit may improve elasticity of the resin layer after curing, and thus allow the resin layer to exhibit strong restoring properties and excellent scratch resistance. For example, the acrylate may include about 10 mol % to 50 mol % of an ethylene oxide repeat unit. The acrylate containing about 10 mol % or more of an ethylene oxide repeat unit may have an index of refraction from about 1.35 to about 1.55. Herein, mol % may be based on the number of ethylene oxide repeat units in the compound.

The monofunctional or polyfunctional UV curable monomer may include at least one selected from the group consisting of (meth)acrylate monomers without limitation. For example, the monofunctional or polyfunctional UV curable monomer may include at least one selected from the group consisting of 1,6-hexanediol mono(meth)acrylate, 2-hydroxy ethyl(meth)acrylate, 2-hydroxy propyl(meth)acrylate, 2-hydroxy butyl(meth)acrylate, 2-hydroxy-3-phenyl oxypropyl(meth)acrylate, 1,4-butanediol(meth)acrylate, 2-hydroxyalkyl(meth)acryloyl phosphate, 4-hydroxy cyclohexyl(meth)acrylate, neopentyl glycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerin di(meth)acrylate, t-hydrofurfuryl(meth)acrylate, iso-decyl (meth)acrylate, 2-(2-ethoxyethoxy) ethyl(meth)acrylate, stearyl(meth)acrylate, lauryl(meth)acrylate, 2-phenoxyethyl (meth)acrylate, isobornyl(meth)acrylate, tridecyl(meth) acrylate, ethoxylated nonylphenol(meth)acrylate, ethylene glycol di(meth)acrylate, diethylene glycol di(meth)acrylate, triethylene glycol di(meth)acrylate, t-ethylene glycol di(meth)acrylate, polyethylene glycol di(meth)acrylate, 1,3-butylene glycol di(meth)acrylate, tripropylene glycol di(meth) acrylate, ethoxylated bisphenol-A di(meth)acrylate, cyclohexanedimethanol di(meth)acrylate, phenoxy-t-glycol (meth)acrylate, 2-methacryloyloxyethyl phosphate, dimethylol tricyclodecane di(meth)acrylate, trimethylolpropane benzoate acrylate, fluorinated (meth)acrylate, phenoxybenzyl acrylate, bisphenol F acrylate, bisphenol A epoxy acrylate, novolac epoxy acrylate, phenylphenoxyethyl acrylate, ethoxylated thiodiphenyl diacrylate, phenylthioethyl acrylate, urethane acrylate, and mixtures thereof.

The antistatic agents may have a structure in which an ionic conductive polymer, in which an ionic conductive metal is ionically bonded to ethylene oxide or propylene oxide, is bonded to a silicone-based reactive resin, without being limited thereto.

The photocurable resin layer may have a thickness from about 3 µm to about 20 µm, for example, from 3 µm to 8 µm.

Referring again to FIGS. 2 and 3, the plurality of amorphous patterns 115 such as a pattern (I) or a pattern (II) may be formed on the surface of the curable resin layer 113. The amorphous patterns 115 may be formed by laser patterning. For example, the amorphous patterns 115 may be formed by forming etched patterns on an engraving roll through laser patterning after coating a photoresist resin thereon, followed by transferring the etched patterns to the UV curable resin. When the amorphous patterns are formed by such a laser patterning process, the curable resin layer may have a low possibility of disturbing incident light by internal diffusion elements such as beads therein since the curable resin layer may not include such light diffusion elements.

The amorphous patterns 115 may have a total area of about 30% to about 70% that of the film. Referring to FIG. 2, in one embodiment, the plurality of amorphous patterns (I, II), which have an irregular shape, may be formed on the surface of the photocurable resin layer while being separated by a distance from each other. Each of the amorphous patterns may have a maximum length ($M_{max}$) (i.e., the longest distance between two opposing points on the perimeter of the amorphous pattern) of about 300 µm or less, for example, from about 100 µm to about 300 µm. Each of the amorphous patterns may also have a minimum length ($M_{min}$) (i.e., the shortest distance between two opposing points on the perimeter of the amorphous pattern) of about 10 µm or more, for example, from about 10 µm to about 100 µm. For example, the amorphous patterns may have a maximum length ($M_{max}$) from 100 µm to 200 µm, and a minimum length ($M_{min}$) from 10 µm to 50 µm. In addition, the amorphous patterns may have a height of about 0.09 µm or less, for example, from about 0.01 µm to about 0.09 µm. Within this size range of the amorphous patterns, the film may exhibit excellent properties in terms of haze, gloss and visibility.

The amorphous patterns 115 may have a plurality of protrusions 111 on the surface thereof. According to embodiments of the present invention, since roughness may be formed on an anti-glare layer by embossing (e.g., extrusion) after formation of recesses on the engraving roll through sand-blasting instead of using agglomerated silica, the protrusions may be formed of the same material as that of the photocurable resin layer on the transferred amorphous patterns. As such, since the anti-glare film does not exhibit deteriorated haze, the anti-glare film can exhibit excellent diffusion of light. The amorphous patterns 115 having the protrusions 111 formed thereon may have an average roughness (Ra) from about 0.001 to about 0.05 μm. The protrusions 111 may have a height from about 0.01 μm to about 0.1 μm, and an average interval (N) from about 1 μm to about 300 μm therebetween.

According to embodiments of the present invention, the anti-glare film may have an average roughness (Ra) from about 0.001 to about 0.03 μm. In addition, the anti-glare film may have a gloss from about 30% to about 60% in a direction of 20°, a gloss from about 35% to about 90% in a direction of 60°, and a gloss from about 85% to about 150% in a direction of 85°, as measured using a gloss meter in accordance with ASTM D-523. Within this range, the anti-glare film can exhibit excellent visibility.

As described above, since the anti-glare film according to embodiments of the invention has the plurality of amorphous patterns thereon and the plurality of protrusions formed on the surface of the amorphous patterns, the anti-glare film can exhibit excellent diffusion of light and, particularly, excellent front brightness without deterioration of transmittance. For example, the anti-glare film can provide excellent visibility when applied to polarizing plates and display devices.

Method of Fabricating an Anti-Glare Film

In one embodiment of the invention, a method of fabricating an anti-glare film may include: etching a surface (e.g., an outer surface) of an engraving roll through laser patterning to form amorphous patterns thereon; performing sand-blasting on the surface of the engraving roll having the amorphous patterns to form recesses on the amorphous patterns; preparing an embossing roll by plating the engraving roll on which the amorphous patterns and the recesses are formed; and transferring the pattern from a surface of the embossing roll to a photocurable resin layer.

Now, the method will be described in more detail. First, a polished engraving roll plated with copper is prepared, and a photoresist resin (PR) is coated onto the surface of the engraving roll, followed by etching the surface (e.g., the outer surface) of the engraving roll using a laser processing machine to form patterns on the outer surface thereof. Then, engraved recesses are formed on the patterns (formed on the surface of the engraving roll by laser patterning) through dry sand-blasting of surfaces of the patterns using circular particles having a diameter from about 1 μm to about 45 μm. Then, the PR layer is removed using a solvent. After completion of the sand-blasting, the engraving roll is plated (with a thin layer of metal), thereby preparing an embossing roll. The pattern on the surface of the prepared embossing roll is transferred to a UV curable resin (or a UV curable resin layer), thereby providing an anti-glare film.

Hereinafter, the present invention will be described in more detail with reference to some examples. However, it should be noted that these examples are provided for illustration only and are not to be construed in any way as limiting the scope of the present invention.

EXAMPLES

Examples 1 to 3 and Comparative Examples 1 and 2

Example 1

After a polished engraving roll (ϕ315×1800 mm) plated with copper was prepared, a photoresist resin (PR) was coated to a thickness of 5 μm onto a surface of the engraving roll, followed by etching the surface of the engraving roll using a laser processing machine to form patterns on the surface thereof as shown in FIG. 1. After the PR layer was removed using a solvent, an embossing roll was prepared by plating the engraving roll with nickel.

After an acrylic UV curable resin (FA-9883-102, SK-CYTEC Co., Ltd., Korea) was coated onto a transparent PET (TOYOBO Co., Ltd., Japan) substrate, the patterned surface of the prepared embossing roll was transferred to the UV curable resin (by embossing the surface of the UV curable resin with the prepared embossing roll), thereby preparing an anti-glare film.

Figure 4:
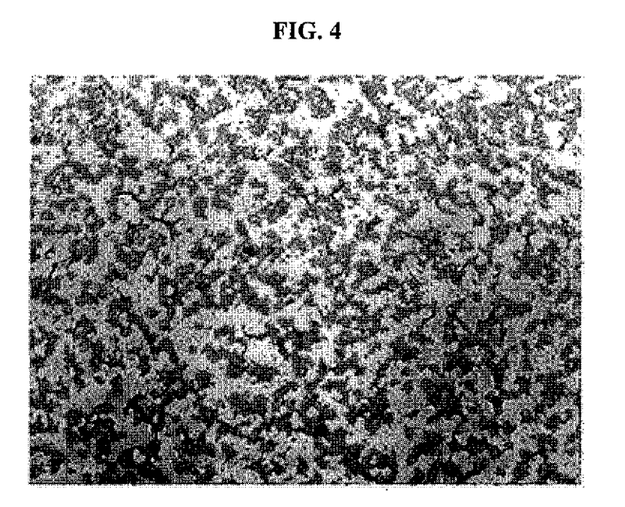
FIG. 4 is a laser microscope picture of a surface of an anti-glare film of Example 1.

Measured properties of the prepared anti-glare film are shown in Table 1, and a picture thereof taken using a laser microscope (VK-9500, Keyence Co., Ltd.) is shown in FIG. 4.

Example 2

After a polished engraving roll (ϕ315×1800 mm) plated with copper was prepared, a photoresist resin (PR) was coated to a thickness of 5 μm onto a surface of the engraving roll, followed by etching the surface of the engraving roll using a laser processing machine to form patterns on the surface thereof as shown in FIG. 1. Then, engraved recesses were formed on the patterns (formed on the surface of the engraving roll by laser patterning) by performing dry sand-blasting on the surfaces of the patterns at 150 kPa through reciprocation of a blast gun once using circular particles having a diameter from about 1 μm to about 45 μm. Then, the PR layer was removed. After completion of the sand-blasting, the engraving roll was plated with nickel, thereby preparing an embossing roll.

After an acrylic UV curable resin (FA-9883-102, SK-CYTEC Co., Ltd., Korea) was coated onto a transparent PET (TOYOBO Co., Ltd., Japan) substrate, the patterned surface of the prepared embossing roll was transferred to the UV curable resin, thereby preparing an anti-glare film.

Figure 5:
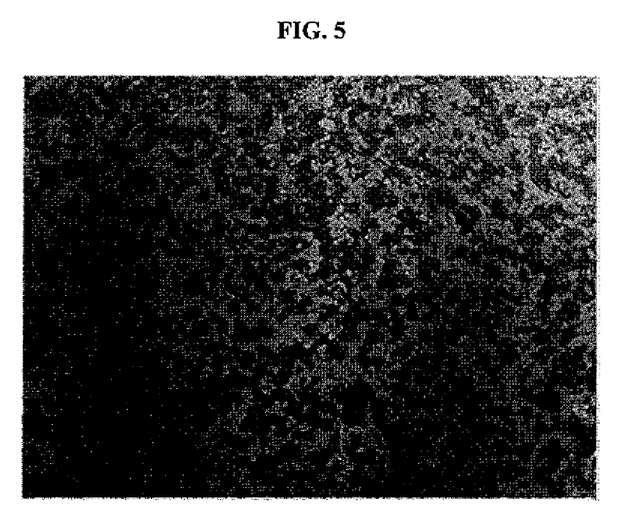
FIG. 5 is a laser microscope picture of a surface of an anti-glare film of Example 2.

Measured properties of the prepared anti-glare film are shown in Table 1, and a picture thereof taken using a laser microscope (VK-9500, Keyence Co., Ltd.) is shown in FIG. 5.

Example 3

An anti-glare film was prepared after preparation of an embossing roll in the same manner as in Example 2 except that dry sand-blasting was performed at 150 kPa by reciprocating a blast gun three times.

Figure 6:
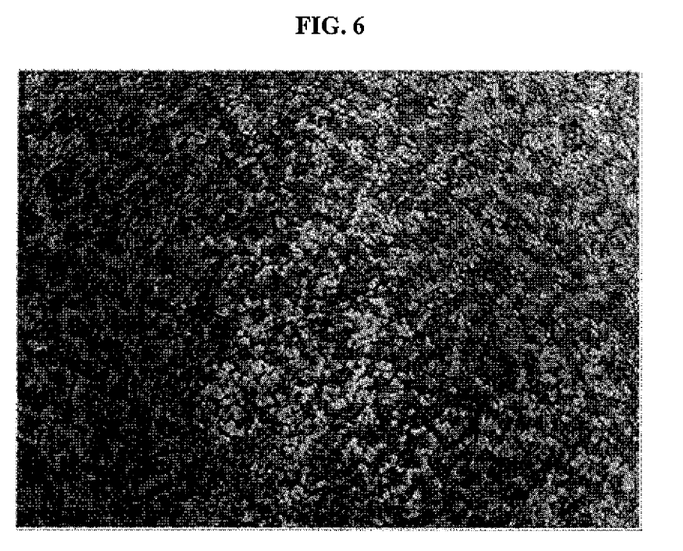
FIG. 6 is a laser microscope picture of a surface of an anti-glare film of Example 3.

Measured properties of the prepared anti-glare film are shown in Table 1, and a picture thereof taken using a laser microscope (VK-9500, Keyence Co., Ltd.) is shown in FIG. 6.

Comparative Example 1

After a polished engraving roll (ϕ315×1800 mm) plated with copper was prepared, laser patterning was omitted, and engraved recesses were formed on the surface of the engraving roll by performing dry sand-blasting on the surfaces of the patterns at 150 kPa through reciprocation of a blast gun three times using circular particles having a diameter from about 1 μm to about 45 μm. After completion of sand-blasting, the engraving roll was plated with nickel, thereby preparing an embossing roll.

After an acrylic UV curable resin (FA-9883-102, SK-CYTEC Co., Ltd., Korea) was coated onto a transparent PET (TOYOBO Co., Ltd., Japan) substrate, the patterned surface of the prepared embossing roll was transferred to the UV curable resin, thereby preparing an anti-glare film.

Figure 7:
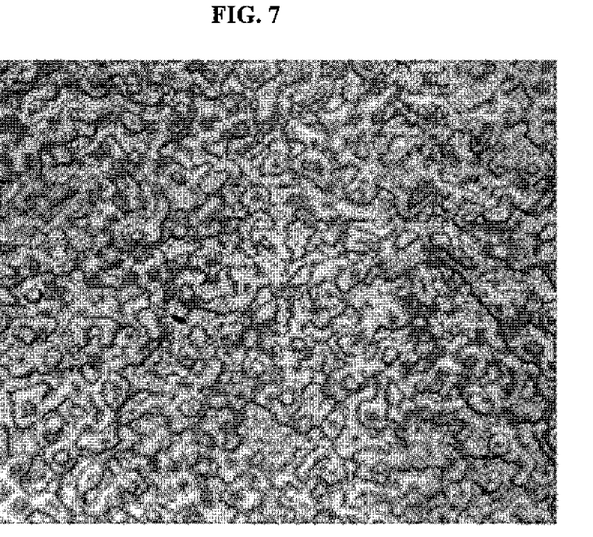
FIG. 7 is a laser microscope picture of a surface of an anti-glare film of Comparative Example 1.

Measured properties of the prepared anti-glare film are shown in Table 1, and a picture thereof taken using a laser microscope (VK-9500, Keyence Co., Ltd.) is shown in FIG. 7.

Comparative Example 2

An anti-glare film was prepared after preparation of an embossing roll in the same manner as in Comparative Example 1 except that dry sand-blasting was performed at 150 kPa by reciprocating a blast gun six times.

Figure 8:
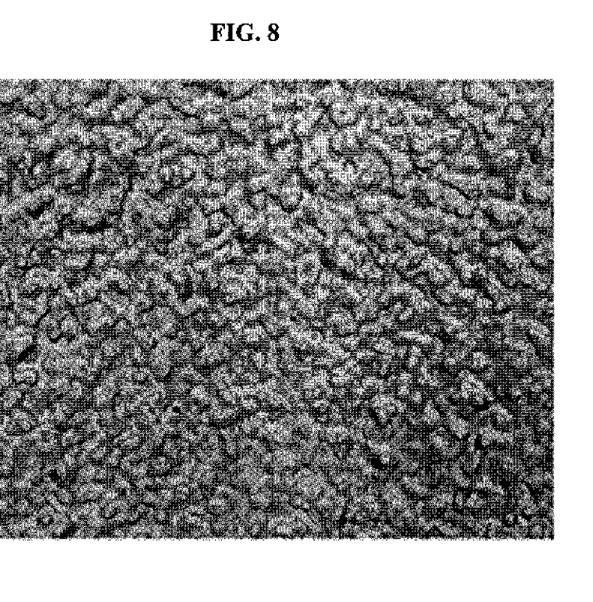
FIG. 8 is a laser microscope picture of a surface of an anti-glare film of Comparative Example 2.

Measured properties of the prepared anti-glare film are shown in Table 1, and a picture thereof taken using a laser microscope (VK-9500, Keyence Co., Ltd.) is shown in FIG. 8.

Property Evaluation

Average interval between protrusions: An average interval between protrusions formed on the surfaces of the amorphous patterns was measured using a laser microscope (VK-9500, Keyence Co., Ltd.) in accordance with JIS B0601-1994.

Gloss: Under conditions wherein rear reflection was prevented by depositing methylphenyl silicone oil on a front surface of an optical glass plate, a rear surface of which was coated with a black ink, 20° gloss, 60° gloss and 85° gloss were measured on each of the anti-glare films using a gloss meter (Micro TRI Gloss, BYK Gardner Co., Ltd.).

Haze: Haze of the anti-glare film was measured in an ISO mode using a Haze Guard II (Toyo Seiki Seisaku-Sho Co., Ltd.).

Figure 9:
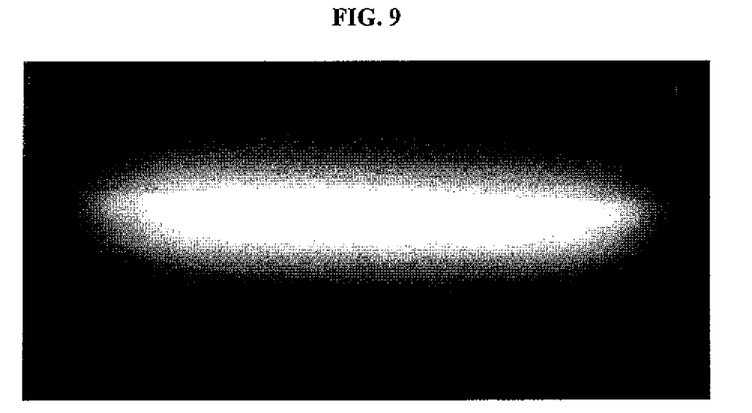
FIG. 9 is an image of a fluorescent lamp reflected on the surface of the anti-glare film of Comparative Example 1.
Figure 10:
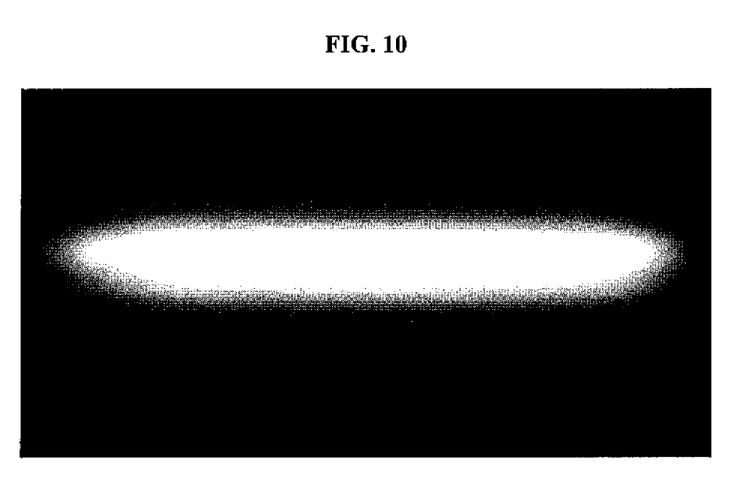
FIG. 10 is an image of a fluorescent lamp reflected on the surface of the anti-glare film of Example 1.

Anti-glare (Visibility): When the film was observed by the naked eye while being illuminated by a fluorescent lamp placed behind the film, scarcely visible light, slightly visible light and severely visible light on the surface of the anti-glare film by reflection of fluorescent light were rated as high, middle and low, respectively. FIG. 9 is a photographic image of the fluorescent lamp reflected on the surface of the anti-glare film of Comparative Example 1, and FIG. 10 is a photographic image of the fluorescent lamp reflected on the surface of the anti-glare film of Example 1.

Roughness (Ra): Average roughness on an overall area of the film was measured using a laser microscope (VK-9500, Keyence Co., Ltd.) in accordance with ASTM D4417.

TABLE 1

|  | Example 1 | Example 2 | Example 3 | Comparative Example 1 | Comparative Example 2 |
|---|---|---|---|---|---|
| Average roughness (Ra) (μm) | 0.015 | 0.020 | 0.030 | 0.030 | 0.030 |
| Average interval between protrusions (μm) | — | 50 | 30 | 30 | 10 |
| Gloss (%) 20° gloss | 30 | 40 | 60 | 75 | 85 |
| 60° gloss | 35 | 75 | 85 | 110 | 128 |
| 85° gloss | 90 | 95 | 110 | 105 | 99 |
| Haze (%) | 1 | 2.5 | 2.5 | 2.5 | 2.5 |
| Visibility | Middle | High | Middle | Low | Low |

As shown in Table 1, it can be seen that the films according to Examples 1 to 3 had a gloss from about 30% to about 60% in a direction of 20°, a gloss from about 35% to about 90% in a direction of 60°, and a gloss from about 85% to about 150% (e.g., from about 85% to about 110%) in a direction of 85° as measured using a gloss meter in accordance with ASTM D-523, and thus exhibited excellent visibility, and that the films according to Examples 1 to 3 had a low haze value, and thus exhibited excellent diffusion of light, as compared with the films according to Comparative Examples 1 to 2, which are free from the amorphous patterns. In addition, as shown in FIGS. 9 and 10, it can be seen that the anti-glare film of Example 1 exhibited excellent concealment of a reflected image, that is, excellent visibility, by reducing the clarity of the reflected image of an external object.

Although some embodiments have been disclosed herein, it should be understood by those skilled in the art that various modifications, changes, and alterations can be made without departing from the spirit and scope of the invention, as defined by the following claims and equivalents thereof.

What is claimed is:

1. An anti-glare film comprising: a transparent substrate; a curable resin layer on a surface of the transparent substrate; and
a plurality of amorphous patterns on a surface of the curable resin layer,
wherein the anti-glare film has a gloss from about 30% to about 60% in a direction of 20°, a gloss from about 35% to about 90% in a direction of 60°, and a gloss from about 85% to about 150% in a direction of 85°, as measured using a gloss meter in accordance with ASTM D-523;
wherein the plurality of amorphous patterns have a total area of about 30% to about 70% that of the anti-glare film, and the anti-glare film has an average roughness (Ra) from about 0.001 μm to about 0.03 μm.

2. The anti-glare film according to claim 1, wherein the plurality of amorphous patterns have a plurality of protrusions formed on surfaces thereof.

3. The anti-glare film according to claim 2, wherein the plurality of amorphous patterns having the plurality of protrusions formed thereon have an average roughness (Ra) from about 0.001 to about 0.05 μm.

4. The anti-glare film according to claim 1, wherein each of the plurality of amorphous patterns is separated from each other, and has a maximum length ($M_{max}$) from about 100 μm to about 300 μm, and a minimum length ($M_{min}$) from about 10 μm to about 100 μm.

5. The anti-glare film according to claim 2, wherein the plurality of protrusions have an average height from about 0.01 pm to about 0.09 pm from a surface of the amorphous patterns, and an average interval from about 1 pm to about 300 pm.

6. The anti-glare film according to claim 1, wherein the transparent substrate has a thickness from about 50 μm to about 250 μm, and the curable resin layer has a thickness from about 3 μm to about 20 μm.

7. The anti-glare film according to claim 1, wherein the transparent substrate comprises triacetyl cellulose (TAC), polyethylene terephthalate (PET) or polycarbonate.

8. A method of fabricating an anti-glare film, comprising:
etching a surface of an engraving roll through laser patterning to form amorphous patterns thereon; and
transferring the amorphous patterns from the surface of the engraving roll to a curable resin to form the anti-glare film having a gloss from about 30% to about 60% in a direction of 20°, a gloss from about 35% to about 90% in a direction of 60°, and a gloss from about 85% to about 150% in a direction of 85°, as measured using a gloss meter in accordance with ASTM D-523, wherein the amorphous patterns have a total area of about 30% to about 70% that of the anti-glare film, and the anti-glare film has an average roughness (Ra) from about 0.001 μm to about 0.03 μm.

9. The method according to claim 8, further comprising:
performing sand-blasting on the surface of the engraving roll having the amorphous patterns to form recesses on the amorphous patterns.

10. The method according to claim 9, wherein the sand-blasting is dry sand-blasting using circular particles having a diameter from about 1 μm to about 45 μm.

11. The method according to claim 9, further comprising:
preparing an embossing roll by plating the surface of the engraving roll having the amorphous patterns and the recesses; and
transferring a pattern from a surface of the embossing roll to the curable resin.

\* \* \* \* \*